United States Patent
Grossmann (10) Patent No.: US 9,019,354 B2
(45) Date of Patent: Apr. 28, 2015

(54) CALIBRATION OF AN AUTOSTEREOSCOPIC DISPLAY SYSTEM

(75) Inventor: Christoph Grossmann, Hamburg (DE)

(73) Assignee: SeeFront GmbH, Hamburg (DE)

( * ) Notice: Subject to any disclaimer, the term of this patent is extended or adjusted under 35 U.S.C. 154(b) by 484 days.

(21) Appl. No.: 13/398,947

(22) Filed: Feb. 17, 2012

(65) Prior Publication Data

US 2013/0182083 A1 Jul. 18, 2013

(30) Foreign Application Priority Data

Jan. 12, 2012 (EP) .................................... 12150988

(51) Int. Cl.
H04N 13/04 (2006.01)

(52) U.S. Cl.
CPC ....... H04N 13/0425 (2013.01); H04N 13/0402 (2013.01)

(58) Field of Classification Search
None
See application file for complete search history.

(56) References Cited

U.S. PATENT DOCUMENTS

| | | | |
|---|---|---|---|
| 6,302,541 B1 | 10/2001 | Grossmann | |
| 2004/0263970 A1 | 12/2004 | McKee, Jr. | |
| 2006/0132916 A1 | 6/2006 | Oikawa et al. | |
| 2008/0135733 A1* | 6/2008 | Feilkas et al. | 250/208.1 |
| 2009/0201363 A1* | 8/2009 | Grossmann | 348/59 |
| 2010/0033680 A1* | 2/2010 | Krijn et al. | 353/8 |
| 2010/0066817 A1* | 3/2010 | Zomet et al. | 348/51 |
| 2010/0245535 A1* | 9/2010 | Mauchly | 348/14.08 |
| 2010/0245824 A1 | 9/2010 | Schwarz et al. | |
| 2011/0316985 A1* | 12/2011 | Ishikawa et al. | 348/51 |
| 2012/0013711 A1* | 1/2012 | Tamir et al. | 348/46 |
| 2012/0105611 A1* | 5/2012 | Godar | 348/54 |
| 2012/0229512 A1* | 9/2012 | Hayashi et al. | 345/649 |
| 2013/0278727 A1* | 10/2013 | Tamir et al. | 348/47 |
| 2014/0056508 A1* | 2/2014 | Lee et al. | 382/154 |
| 2014/0219550 A1* | 8/2014 | Popa et al. | 382/154 |

FOREIGN PATENT DOCUMENTS

| | | |
|---|---|---|
| DE | 10252830 B3 | 5/2004 |
| WO | 2008011888 A1 | 1/2008 |

OTHER PUBLICATIONS

Tsai, R.Y., A versatile camera calibration technique for high-accuracy 3D machine vision metrology using off-the-shelf TV cameras and lenses, IEEE Journal on Robotics and Automation, Aug. 1, 1987, pp. 323-344, vol. RA-3, No. 4.

(Continued)

*Primary Examiner* — Dave Czekaj
*Assistant Examiner* — Mohammad J Rahman
(74) *Attorney, Agent, or Firm* — Richard M. Goldberg (57) ABSTRACT

A method for calibrating an autostereoscopic display system, having the steps of detecting a camera viewing position (P) of a camera (16; 116) arranged to be able to observe a display (22) of the autostereoscopic display system (S12), providing and displaying on the display (22) in an autostereoscopic display mode of the display (22) a test pattern including different image information for at least two laterally displaced respective viewing positions (28; 32) in front of the display (22), of which viewing positions at least one is based on the detected camera viewing position (P), based on system parameters of the autostereoscopic display system (S14, S16), and adjusting at least one of the system parameters based on a camera image of the test pattern as observed by the camera (16; 116) (S22).

17 Claims, 8 Drawing Sheets

(56) References Cited

OTHER PUBLICATIONS

Zhang, Z., A flexible new technique for camera calibration, Technical Report Microsoft Research MSR TR, XX XX, Dec. 2, 1998, pp. 1-22, vol. MSR-TR-98-71.

Kaplan, S.H., Theory of Parallax Barriers, SMPTE Journal, Jul. 1, 1952, pp. 11-21, vol. 59, No. Part 02, SMPTE, Easton, PA.

\* cited by examiner

CALIBRATION OF AN AUTOSTEREOSCOPIC DISPLAY SYSTEM

BACKGROUND OF THE INVENTION

The invention relates to a method for calibrating an autostereoscopic display system. More specifically, the invention relates to a method for calibrating an autostereoscopic display system having a display device and an imaging array.

According to the general principles of stereoscopy, an impression of spatial depth is generated by presenting to the two eyes of a viewer different images that show the same scene from slightly different perspectives, which reflect the parallax difference between the left and right eye of the viewer.

Whereas conventional systems for presenting different images to the left and right eyes of the viewer employ headsets, shutter glasses or polarisation glasses, which may be disturbing for the viewer, autostereoscopic or glasses-free 3D display systems do not require such additional means but permit to view stereoscopic images "with the naked eye".

U.S. Pat. No. 6,302,541 B1 and WO 2008/011888 A1 describe methods for the autostereoscopic representation of images, wherein image information of separate channels for a right eye and a left eye of a viewer is displayed in interleaved segments on a screen, and an imaging array consisting of a lens array is disposed for deflecting light emitted from the screen such that the image information of each channel is visible only for one eye of the viewer.

In order to provide separate image information for the left and right eyes of the viewer, geometrical and/or optical parameters of the display device and the imaging array and their relative arrangement must be known.

In case an imaging array is mounted during manufacture of an autostereoscopic display and is not intended to be repeatedly detached and mounted by a user, the alignment and/or calibration of the relative arrangement may be performed during manufacturing of the system, e.g. using dedicated alignment equipment and depending on visual inspection by trained personal.

Autostereoscopic display systems that have an imaging array which is user mountable and detachable and/or which is switchable between an active mode and an inactive mode have the advantage that the user may choose to use a display device of the system in a 2D-mode or, by mounting the imaging array and/or switching the imaging array to active mode, in a 3D-mode.

SUMMARY OF THE INVENTION

It is an object of the invention to provide a method for calibrating an autostereoscopic display system that simplifies calibration, and that is suitable for manufacturing calibration as well as on-site calibration.

In order to achieve this object, a method for calibrating an autostereoscopic display system comprises the steps of:

detecting a camera viewing position of a camera arranged to be able to observe a display of the autostereoscopic display system, providing and displaying on the display in an autostereoscopic mode of the display a test pattern comprising different image information for at least two laterally displaced respective viewing positions in front of the display, of which viewing positions at least one is based on the detected camera viewing position, based on system parameters of the autostereoscopic display system, and adjusting at least one of the system parameters based on a camera image of the test pattern as observed by the camera.

For example, at least one of the at least two viewing positions may correspond to the detected camera viewing position.

It is a main advantage of this method that it uses a camera for observing image information displayed on the display while imposing no strict requirements on the positioning of the camera. Since the viewing position of the camera is detected and the image information is provided and displayed based on the detected camera viewing position, the method is particularly useful for on-site calibration initiated by a user. Furthermore, the method may be performed automatically.

For example, the method is a method for calibrating an autostereoscopic display system that is adapted for displaying different image information for different viewing positions in interleaved segments on a display device of the system, wherein the system comprises an imaging array for directing different images to different viewing positions.

A system and a software product adapted to carry out the method are defined in the independent product claims.

More specific features of preferred embodiments of the invention are indicated in the dependent claims.

The system may comprise a display device having a two-dimensional array of display elements e.g. arranged in rows and columns, i.e. a display device for displaying image information. Preferably, the display device is a colour display device.

The system may comprise an imaging array for directing different images to different viewing positions. The imaging array may be of any type that is known in the art and may be or comprise e.g. a parallax barrier, or a lens array, also known as a lenticular array, and/or a light forming or guiding arrangement, e.g. a plate with optical elements, structures and/or patterns for shaping the light emission pattern of a backlight. The imaging array may comprise diffracting optical elements and/or refracting optical elements.

For example, a parallax barrier may comprise slits that, when positioned at a distance from a screen of the display device, allow different segments of the screen to be visible for the left and right eyes of the viewer. The segments for the left eye are blocked for the right eye and vice versa. For example, the parallax barrier may be a liquid crystal matrix. The parallax barrier may be a backlight parallax barrier or positioned in front of the display device.

For example, a lenticular array may comprise an array of elongated lenses. Each lens forms a converging lens in its cross-sectional direction. Such lenticular arrays are also known as cylinder lens arrays. Through the lenticular array, different segments of the display device are visible e.g. from a left eye viewing position and a right eye viewing position. However, different from the parallax barrier, there is no need for a dark grid defining barrier slits. For example, the lens array may be an array of lenses having refraction properties that are light polarization dependent and/or dependent on an applied electrical field. For example, the imaging array may be a gradient-index lens array, in particular a liquid crystal gradient index lens array.

Because of the small structures of an imaging array, and because of the required relative positioning of the imaging array and the displayed image information, an accurate calibration of geometric system parameters, in particular parameters of the relative arrangement of the display device and the imaging array, is important.

For example, the imaging array may be switchable between an active mode (i.e., an autostereoscopic mode of the display) and an inactive mode and may be adapted for directing different images to different viewing positions in the active mode, only.

For example, the autostereoscopic system may be adapted to display image information for at least two different view points concurrently and/or sequentially.

The test pattern is provided and displayed based on system parameters of the autostereoscopic display system. The camera is arranged for observing the displayed test pattern. Therefore, the camera image is dependent on the imaging function of the imaging array and, thus, may reveal a condition requiring calibration.

Preferably, the step of detecting the camera viewing position of a camera comprises detecting visual indicators, which have known spatial positions relative to the camera. For example, the visual indicators may comprise markings, such as calibration marks, that are attached to the camera, e.g. to a camera housing. Preferably, however, the visual indicators are formed by image information displayed on the display device, and preferably, the camera has a known spatial position and orientation relative to the display device. For example, the camera is mounted to the display device. For example, the camera may be arranged to observe the image information displayed on the autostereoscopic display via a plane mirror. The image information displayed may consist of a pattern comprising calibration marks, the display area itself or any geometric pattern with known dimensions suitable for recognition in a camera image of the camera.

In the same embodiment or in a further embodiment, the step of detecting the camera viewing position may comprise detecting visual indicators, which have known spatial positions relative to the display device. For example, the visual indicators may be formed by image information displayed on the display as described above.

Preferably, the visual indicators are detected using a camera that is mounted in a known position and orientation relative to the display device. For example, the camera may be integrated into the display system, e.g. mounted at a border of the display device. For example, the camera viewing position is determined based on positions of the detected visual indicators in a camera image of the camera that is mounted in the known position and orientation relative to the display device. For example, the step of detecting the visual indicators comprises determining real or virtual positions of the visual indicators based on the positions of the visual indicators in a camera image of said camera and based on known relative positions of the visual indicators. For example, the step of detecting the camera viewing position comprises determining the camera viewing position based on the positions of the visual indicators in a camera image of said camera. It may further be based on the known spatial positions of the visual indicators relative to the camera. The positions of the visual indicators can be accurately determined with respect to the camera based on their positions in the camera image of the camera. In particular, a lateral, i.e. horizontal, displacement and/or a vertical displacement of a visual indicator is projected to a corresponding displacement in the two-dimensional camera image.

Preferably, the camera, which is arranged to be able to observe a display of the system, is arranged to be able to observe said display reflected by a mirror. For example, the camera observes the test pattern reflected by the mirror. The viewing position of the camera then becomes a virtual position relative to the display, depending on position and orientation of the mirror. In other words, the method is a method for calibrating an autostereoscopic display system, comprising the steps of:

detecting a camera viewing position of a camera arranged to be able to observe a display of the autostereoscopic display system reflected by a mirror, providing and displaying on the display in an autostereoscopic display mode of the display a test pattern comprising different image information for at least two laterally displaced respective viewing positions in front of the display, of which viewing positions at least one is based on the detected camera viewing position, based on system parameters of the autostereoscopic display system, and adjusting at least one of the system parameters based on a camera image of the test pattern as observed by the camera via the mirror. That is, the method for calibrating an autostereoscopic display system is a method for calibrating an autostereoscopic display system having a calibration arrangement in which the camera is arranged to be able to observe a display of the system in the mirror. For example, the viewing position of the camera is a real viewing position or a virtual viewing position in front of the autostereoscopic display.

Preferably, the camera viewing position of said camera, which is arranged to be able to observe the display of the system, is detected based on a camera image of said camera. That is, the same camera is used for observing the test pattern displayed on the display and for detecting its real or virtual viewing position with regard to the display. In one example, the camera may be arranged for observing said test pattern reflected by a mirror. In a further example, the camera may be arranged opposite and in front of the display, i.e. the camera is arranged to be able to directly observe the display and/or the test pattern displayed on the display. For example, the step of detecting the viewing position of the camera comprises detecting visual indicators having known spatial positions relative to the display device. The step of detecting the camera viewing position of said camera may further comprise determining the camera viewing position with respect to the display device based on determined spatial positions of the visual indicators with respect to said camera. For example, the step of detecting the visual indicators may comprise determining real or virtual positions of the visual indicators based on the positions of the visual indicators in a camera image of said camera and based on known relative positions of the visual indicators. For example, the step of detecting the camera viewing position may comprise determining the camera viewing position based on the positions of the visual indicators in a camera image of said camera. It may be further based on the known spatial positions of the visual indicators relative to the camera.

In a further example, a first camera may be arranged to be able to observe the display of the system, and the viewing position of said first camera may be detected based on a camera image of a second camera. For example, the second camera may be mounted in a known position and orientation relative to the display device. For example, the first camera may be arranged to directly observe the display and/or a test pattern that is displayed on the display.

For example, the step of adjusting may comprise adjusting at least one system parameter that characterises imaging properties of the system, e.g. a parameter that characterises at least one physical system parameter that governs imaging properties of the system, such as an optical and/or geometrical parameter of the system, in particular of an imaging array and/or an arrangement of a display device and an imaging array.

For example, said system parameters comprise at least one software parameter, and the step of adjusting at least one of the system parameters comprises adjusting the at least one software parameter. For example, the software parameter may be adjusted to reflect a physical parameter of the system. For example, the software parameter may be adjusted to reflect the relative spatial arrangement of the display device and the imaging array.

From WO 2008/011888 A1, an autostereoscopic system is known which has software system parameters that characterise a relative spatial arrangement of a screen of a display device and a lens array. Thereby, it is not necessary to have a fixed prescribed relationship between the lenses of the lens array and the pixels that are visible through each of the lenses. Thus, a given lens array can be used with a large variety of screens or display devices with different resolutions and pixel rasters.

In a further example, the autostereoscopic display system may comprise means for physically adjusting a system parameter, and the step of adjusting may comprise physically adjusting a system parameter. For example, the system may comprise means for changing a relative spatial arrangement of the display device and the imaging array, and the step of adjusting at least one of the system parameters may comprise physically adjusting a relative spatial arrangement of the display device and the imaging array.

Preferably, the steps of detecting a viewing position of the camera, providing and displaying said test pattern, and at adjusting at least one of the system parameters are repeated. For example, at least one of the system parameters may be iteratively adjusted by repeating the mentioned steps.

BRIEF DESCRIPTION OF THE INVENTION

Preferred embodiment of the invention will now be described in conjunction with the drawings, wherein.

DETAILED DESCRIPTION

Figure 1:
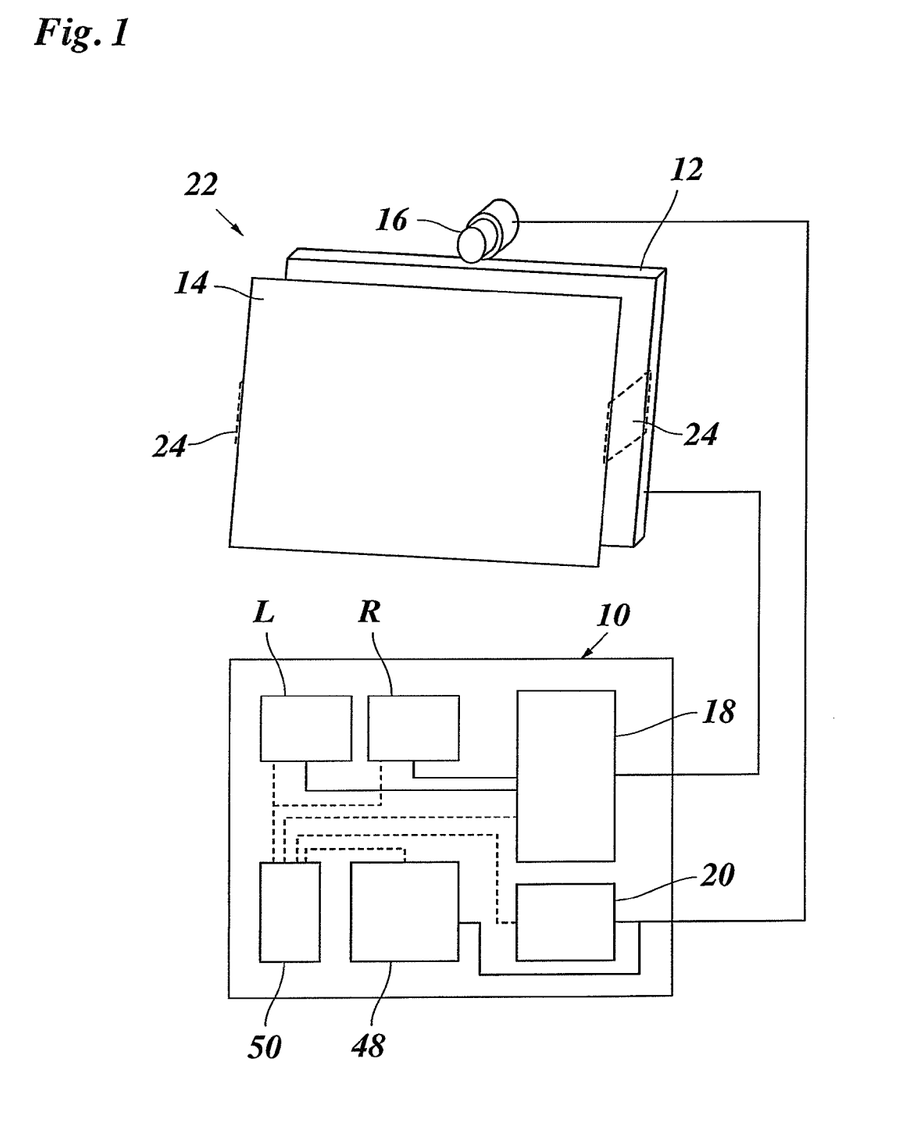
FIG. 1 is a schematical block diagram of an autostereoscopic display system.

The autostereoscopic display system shown in FIG. 1 comprises a computer system 10, e.g. a laptop computer or a personal computer, a display device 12, in front of which an imaging array 14 is arranged, and a camera system comprising at least one camera 16. For example, the camera system may comprise a single camera or multiple cameras. The computer system 10 comprises graphics hardware 18 for driving the display device 12. The autostereoscopic display system further comprises an eye tracking or head tracking unit 20, e.g. a software unit. The eye tracking unit 20 is part of an eye tracking system or head tracking system for detecting a head position or eye position or eye positions of the viewer and providing them to the computer system 10. The eye tracking system or head tracking system may comprise the at least one camera 16 and/or at least one separate camera.

The graphics hardware 18 has access to two memory areas L and R that may be part of a memory of the computer system 10 or part of the graphics hardware 18. The memory area L stores image information for a left viewing position, e.g. a viewing position of a left eye of the viewer. Similarly, the memory area R stores image information for a right viewing position, e.g. a viewing position of the right eye of a viewer.

The camera 16 is mounted at a known position and orientation with respect to the display device 12. For example, the camera 16 may be mounted at a border of the display device 12. The camera 16 is arranged to observe an area in front of the display device 12.

The imaging array 14 is a lens array and is fixedly or detachably mounted to the display device 12. Together, the display device 12 and the imaging array 14 form an autostereoscopic display 22. For example, the imaging array 14 is rigidly mounted to the display device 12 with mounting clamps 24 on opposite borders of the imaging array 14. FIG. 1 shows, for reasons of clarity of the illustration, a large gap between the display device 12 and the imaging array 14. In practice, however, the gap, if any, is small and typically of the order of a focal length of the lenses of the lens array 14 or less, e.g. zero.

Figure 2:
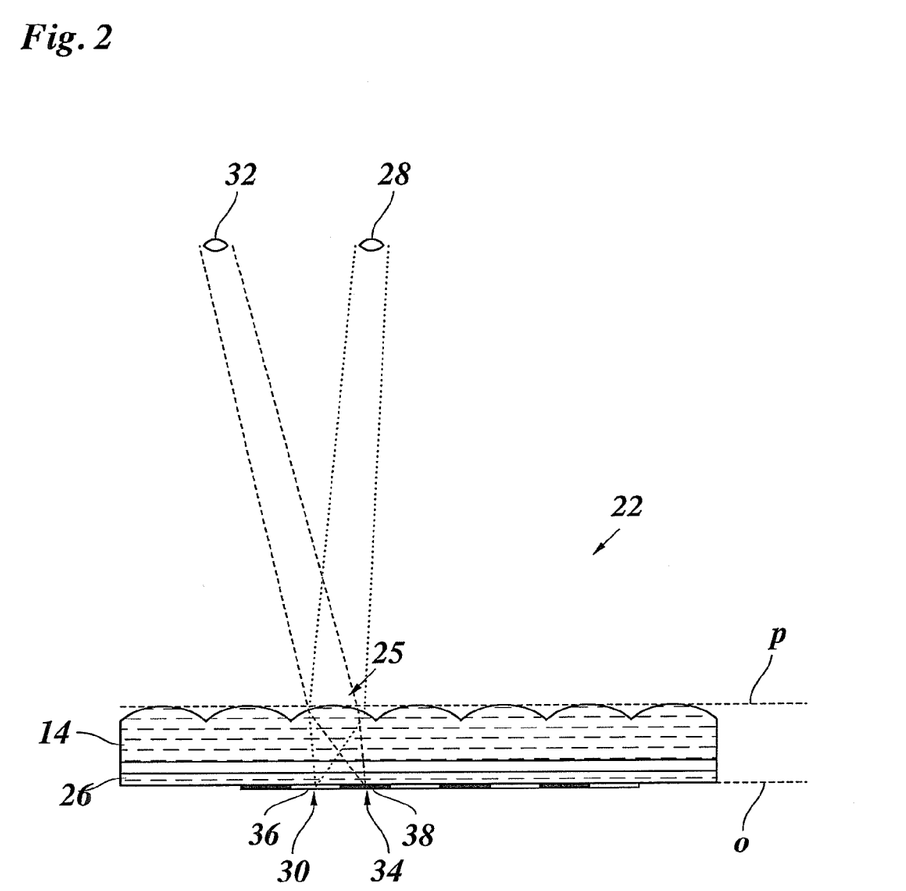
FIG. 2 is a cross-sectional view of the lens array, illustrating the light deflecting properties thereof.

FIG. 2 schematically shows a cross section of the lens array 14 in front of an object plane o of a screen of the display device 12. The lens array 14 is formed by a transparent plate having at least one corrugated surface defining the two dimensional array of parallel cylindrical lenses 25. Thus, the lens array 14 comprises a two dimensional array of elongated lenses 25. The display device 12 is for example a TFT-LCD colour display device. The lens array 14 is arranged adjacent to the front surface 26 of the screen of the display device 12 and might be separated by a gap.

In FIG. 2, exemplary light arrays are shown that originate at different respective display elements, e.g. pixels or subpixels of the screen, and are deflected by one and the same lens of the lens array 14 towards respective viewing positions in front of the display. A viewing position 28, which e.g. corresponds to the left eye of a viewer, receives light from a display element 30. A viewing position 32, e.g. the position of the right eye of a viewer, receives light from a display element 34. The respective light rays have the same apparent origin at a position near the apex of the lens. However, due to the refractive properties of the lens, the display elements 30 and 34 are at different lateral positions. Therefore, the content of the display elements 30 and 34 may be different, so that different image information can be provided to the left and right eyes of the viewer.

Generally, the appropriate viewing positions for the left and right eye of a viewer in order to observe respective image information from the different display elements 30 and 34 are within respective viewing zones. That is, small deviations from the ideal viewing positions can be tolerated.

Preferably, to each lens 25, there are associated a first display segment 36 for displaying image information for the first viewing position 28, and a second display segment 38 for displaying image information for the second viewing position 32. The display segments 36 and 38 associated with the different lenses form an interleaved arrangement on the display device 12. The position of the segment borders are dependent on the viewing positions, e.g. on the viewing positions and on the exact position of the lens array 14 with respect to the display device 12. The display segments 36, 38 have a lateral extension that spans over more than one respective display element 30, 34.

The computer system 10 is adapted to adjust or determine the lateral borders of the segments 36, 38 based on system parameters of the display system, such as a position of a viewing point 28, 32 of a viewer. For example, the autostereoscopic display system may be adapted to correlate each display element with at least one of the viewing points 28, 32 depending on the direction to which light from the display element is deflected by the lens array 14. For example, a display element may be fully correlated with a specific viewing position if light from the display element is deflected towards that viewing position. At the border of the display segments, for example, a display element may be correlated with more than one viewing position, if light from the display element is deflected towards more than one viewing position. WO2008/011888 A1 describes such a method for the autostereoscopic representation of images.

The correlations of the display elements with the viewing positions depend on geometric system parameters, such as the spatial positions of the viewing positions, or geometric and/or optical parameters of the display device 12, the imaging array 14, and their arrangement. Therefore, it is desirable that these parameters are known or calibrated.

In general, relevant system parameters may be calibrated by changing the actual physical parameters of the system, e.g. by aligning the imaging array 14 with a prescribed coordinate system that is in determined relation to the display device 12.

In the described example, however, there are system parameters of the autostereoscopic display system which are software parameters for adapting the autostereoscopic display system to the actual physical parameters of the system. That is, the autostereoscopic display system is adapted for providing and displaying on the display different image information for the laterally displaced respective viewing positions based on software parameters that characterise imaging properties of the system. In particular, these software parameters characterise a relative spatial arrangement of the display device 12 and the imaging array 14.

Figure 3:
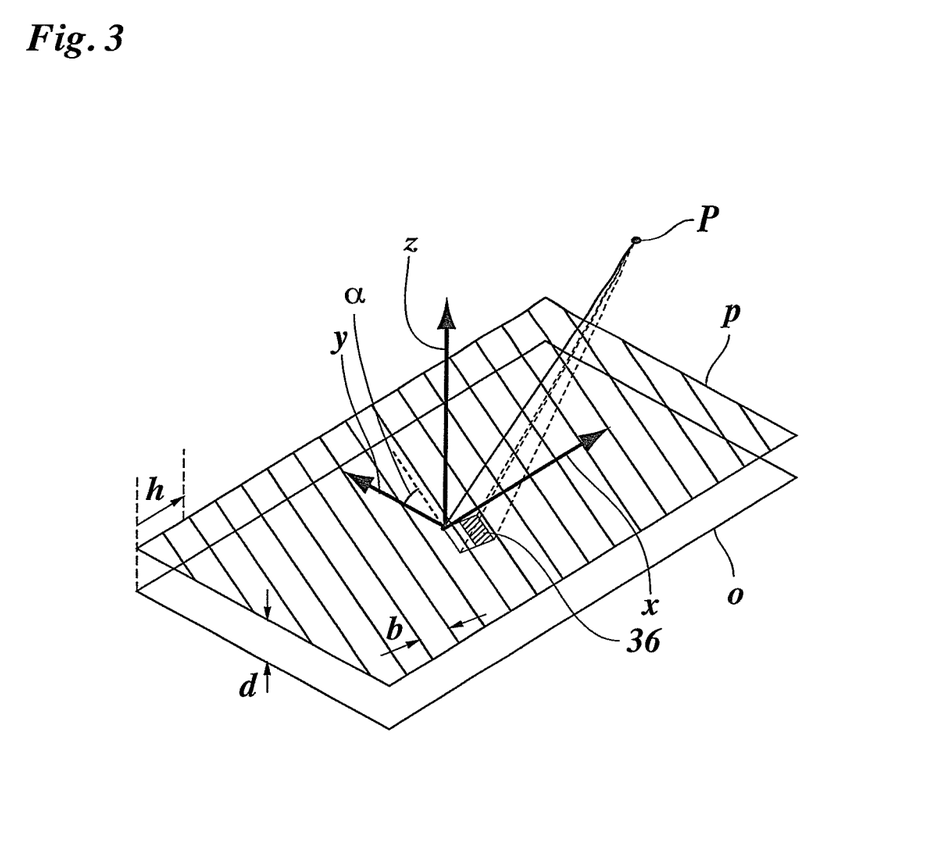
FIG. 3 illustrates various geometric system parameters of the system.

FIG. 3 schematically illustrates geometric system parameters of the autostereoscopic display system, in particular of the relative spatial arrangement of the display device 12 and the imaging array 14. Corresponding software parameters that characterise the physical parameters are stored in the computer system 10.

A distance parameter d describes the distance between the object plane o of the display device 12 and a plane p (FIG. 2) in which apexes of lenses of the lens array 14 lie. For example, the distance parameter d characterises a relative displacement of the display device 12 and the imaging array 14 in a direction z normal to the plane of the display device 12.

A lateral or horizontal position parameter h characterises the relative arrangement of the display device 12 and imaging array 14 in a direction parallel to the plane of the display device 12, in particular in a horizontal direction x. For example, the lateral position parameter h characterises the relative displacement of the display device 12 and the imaging array 14 in the direction x with respect to a reference alignment, i.e. an alignment of a known position of the lens apexes in front of specific positions of the display device 12.

As is schematically illustrated in FIG. 3, the lenses of the lens array 14 are slanted with respect to a vertical direction y of the display device 12 (i.e. vertical in a coordinate system of the display device). An angle parameter a characterises the angle of the lenses with the vertical display element columns or pixel columns of the display device 12. Thus, the angle parameter a characterises a relative rotation of the display device and the imaging array 14 about the direction z normal to the plane of the display device 12.

In an arrangement for calibration of the display system, in which arrangement the camera 16 is arranged for observing image information that is displayed on the display, further system parameters of the autostereoscopic display system characterise a viewing position P, which may be a real viewing position or a virtual viewing position, of the camera 16 with respect to the display device 12. In particular, for example, the viewing position P may characterise a viewing distance Pz being a distance of the viewing position P in the direction z normal to the plane of the display device 12 from the plane o, and viewing Positions Px, Py, being the horizontal and vertical displacements from the center of a Cartesian display coordinate system (DCS).

Further system parameters that may be calibrated include parameters that characterise optical and/or geometrical parameters of the lenses 25 and/or the imaging array 14, such as a lens dimension, e.g. a lens width b, a curvature or a radius of the lenses 25, a magnification factor of the lenses 25, a refraction property of the lenses 25, a thickness of the lenses and/or of the imaging array 14, and a tilt angle between the object plane o of the display device 12 and the plane of the imaging array 14, i.e. a deviation from a parallel alignment.

Thus, e.g. parameter variations due to manufacturing tolerances and/or due to thermal expansion/contraction of the components of the display may be adjusted.

In each case, the software parameters may directly correspond to the respective physical parameters, or may indirectly correspond to physical parameters, e.g. be dependent on physical parameters. For example, the software parameters may be combinations of the physical parameters and/or of parameters dependant on the physical parameters.

Figure 4:
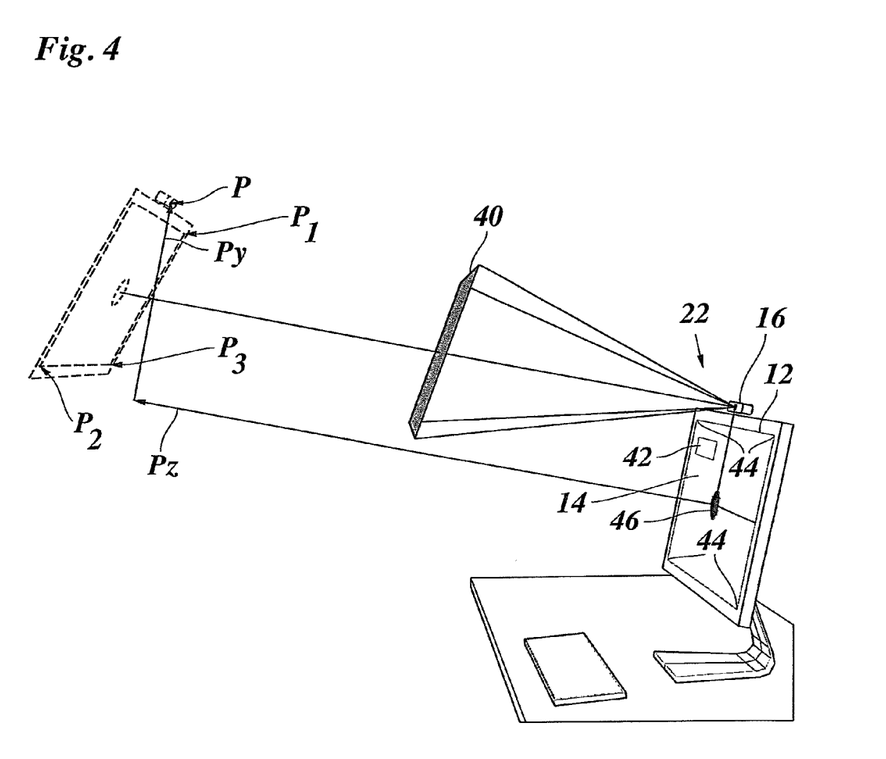
FIG. 4 is a diagram illustrating an arrangement for calibrating the system.

FIG. 4 illustrates an arrangement for calibration of the display system, in which a calibration mirror 40 is positioned at a distance in front of the display device 12, such that the camera 16 can "see" an image of the display 22 in the mirror 40. That is, a camera image of the camera 16 contains a view of the display 22. Thus, the camera 16 is arranged to be able to observe the display 22 and for observing image information that is displayed on the display 22 reflected by the mirror 40. A virtual image of the display 22 appears to be behind the mirror 40 as illustrated in FIG. 4.

Thus, the camera 16 is able to view image information displayed on the autostereoscopic display 22 from a viewing position P that corresponds to the position of the camera 16 in the virtual image with respect to the real display 22. In FIG. 4, Pz illustrates the viewing distance of the camera, i.e. the distance in the z-direction of the camera position in the virtual image. Further, Py illustrates a position in the y-direction of the viewing point P of the camera 16 with respect to the (x, y, z)-coordinate system (display coordinate system) of the display device 12. It is noted that the virtual image as seen by the camera 16 does not necessarily include an image of the camera 16, since the virtual position of the camera 16 with respect to the virtual image of the display 22 is known, e.g. can be calculated from the known spatial position of the camera 16 on top of the display 22.

The exact position of the calibration mirror 40 is not critical for calibrating the display system. For example, the calibration mirror 40 may be manually held by a user or may be otherwise positioned. In order to aid the user in positioning the mirror 40 such that the camera image includes the virtual image of the display 22, the computer system 10 may be adapted to display the camera image in an area 42, e.g. a window, on the screen of the display device 12. The camera image may be a scaled to fit the area 42. During calibrating, the display of the camera image is updated.

Figure 5:
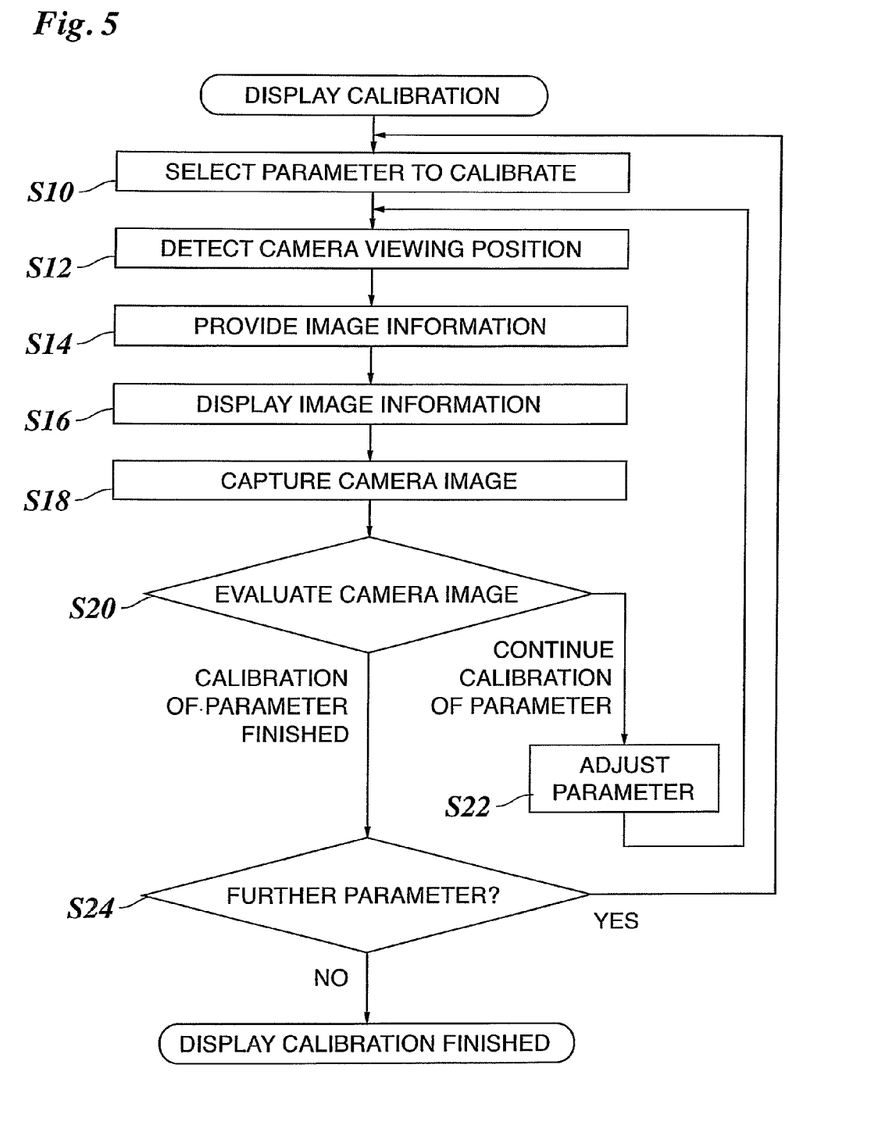
FIG. 5 is a flow diagram of a method for calibrating an autostereoscopic display system.

FIG. 5 illustrates a method for calibrating the display 22 in the arrangement of FIG. 4. In the first step of the calibration method, a parameter to calibrate is selected or determined, in particular a geometric software parameter (step S10). For example, the lateral position parameter h is chosen as the first parameter to calibrate.

A viewing position P of the camera 16 with respect to the display is detected as follows (S12).

First, visual indicators 44, which have known spatial positions relative to the camera 16, are detected in the camera image. For example, the visual indicators 44 are three or four edges of the display area or screen of the display device 12. For example, the corner areas of the display device 12 may show a brightness that is different from the surrounding border of the display device 12 and thus may be easily recognized in the camera image.

The actual physical position and alignment of the camera 16 with respect to the display device 12, on which the camera 16 is mounted, is known e.g. from a factory calibration or determined by design. Furthermore, the raster size, i.e. the horizontal and vertical distance of the display elements of the display device 12 are known, as well as the size of the display device 12. Therefore, the actual physical positions of the visual indicators 44 with respect to the camera 16 can be determined.

Based on the positions of the image of the visual indicators 44 in the camera image, the viewing position P of the camera in the display coordinate system can be determined by a series of transformations in 3D space. This may be accomplished as follows.

Figure 6:
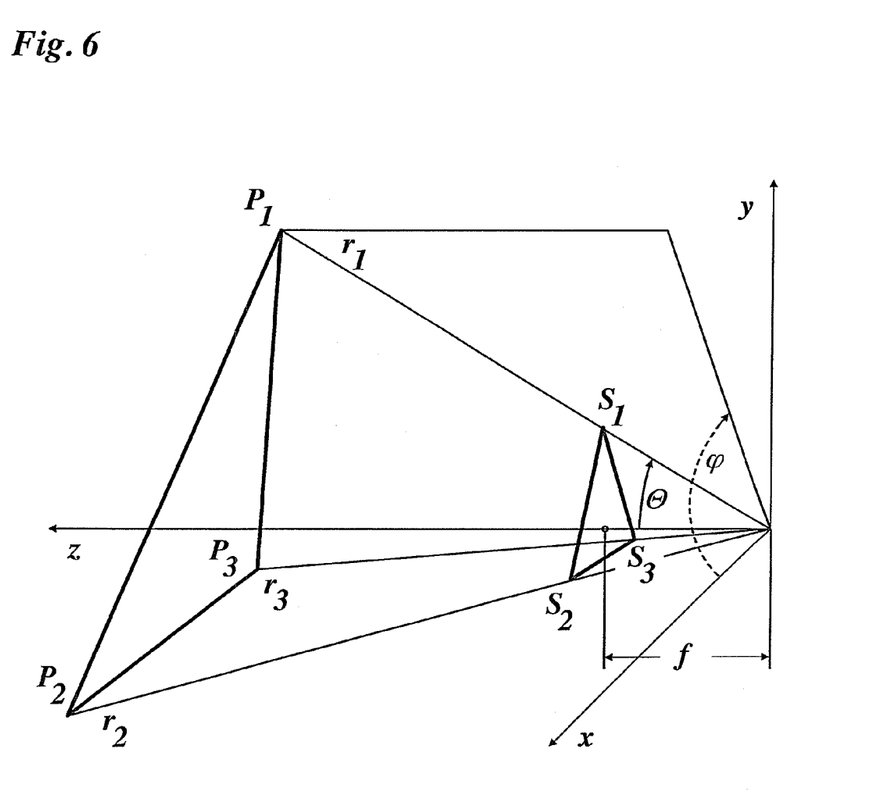
FIG. 6 is a diagram illustrating a method to calculate the position of visual indicators.

In FIG. 6, an object image representing a minimum of three object points $P_1$, $P_2$, $P_3$ of visual indicators 44 is imaged onto the camera sensor of the camera 16 at sensor locations $S_1$, $S_2$, $S_3$. This is easiest described in a spherical coordinate system where the origin is located at the focal point of the camera lens (camera coordinate system) of the camera 16. For practical reasons it can be assumed that the radial distances $r_i$ of the object points $P_1$, $P_2$, $P_3$ are large compared to the focal distance f, and the sensor plane is located at a distance f parallel to the (x, y)-plane of the coordinate system.

The coordinates of the object points in spherical coordinates are $P_i = (r_i, \phi_i, \Theta_i)$ with r radius (distance from origin),
$\phi$ azimuth angle phi (angle of projection on (x, y)-plane),
$\Theta$ polar angle Theta (angle between radius and z-axis).

The coordinates of the sensor image points are $S_i = (u_i, v_i, f)$ with $(u_i, v_i)$ being the Cartesian coordinates of the image points in the sensor plane.

The aim is to determine the coordinates of the object points $P_1$, $P_2$, $P_3$, where the relative location of the object points $P_1$, $P_2$, $P_3$ in the object plane is given from the known distances of the object points $$d_1 = P_1 P_2, \; d_2 = P_2 P_3, \; d_3 = P_3 P_1,$$

which are, due to the reflection properties of the plane mirror 40, the same as the known distances of the corresponding points of the visual indicators 44.

The vectors from the origin to the points in the sensor plane continue straight to the object points $P_1$, $P_2$, $P_3$. From the location of the points in the sensor plane with the Cartesian coordinates $(u_i, v_i, f)$ the corresponding angles $\phi_i$, $\Theta_i$ are known. The respective radii $r_i$ of the object points have to be determined.

Transformation from spherical coordinates to Cartesian coordinates:

$$x = r \sin \Theta \cos \phi, \; y = r \sin \Theta \sin \phi, \; z = r \cos \Theta$$

$$r = \sqrt{x^2 + y^2 + z^2},$$

$$\varphi = \arctan\left(\frac{y}{x}\right),$$

$$\Theta = \arctan\left(\frac{\sqrt{x^2 + y^2}}{z}\right)$$

Here the angles $\phi_i$, $\Theta_i$ are calculated from the known coordinates $(u_i, v_i)$ in the sensor plane at distance f as follows:

$$\varphi_1 = \arctan\left(\frac{v_1}{u_1}\right) \text{ and } \Theta_1 = \arctan\left(\frac{\sqrt{u_1^2 + v_1^2}}{f}\right) \quad (1)$$

$$\varphi_2 = \arctan\left(\frac{v_2}{u_2}\right) \text{ and } \Theta_2 = \arctan\left(\frac{\sqrt{u_2^2 + v_2^2}}{f}\right)$$

$$\varphi_3 = \arctan\left(\frac{v_3}{u_3}\right) \text{ and } \Theta_3 = \arctan\left(\frac{\sqrt{u_3^2 + v_3^2}}{f}\right).$$

The distances $d_i = P_i P_j$ in Cartesian coordinates are $$d_i = \sqrt{(x_j - x_i)^2 + (y_j - y_i)^2 + (z_j - z_i)^2}.$$

With $$a_i = \sin \Theta_i \cos \phi_i, \; b_i = \sin \Theta_i \sin \phi_i, \; c_i = \cos \Theta_i \quad (2)$$

we get a set of equations $$d_1^2 = (r_2 a_2 - r_1 a_1)^2 + (r_2 b_2 - r_1 b_1)^2 + (r_2 c_2 - r_1 c_1)^2$$

$$d_2^2 = (r_3 a_3 - r_2 a_2)^2 + (r_3 b_3 - r_2 b_2)^2 + (r_3 c_3 - r_2 c_2)^2$$

$$d_3^2 = (r_1 b_1 - r_3 a_3)^2 + (r_1 b_1 - r_3 b_3)^2 + (r_1 c_1 - r_3 c_3)^2.$$

By expansion and reformatting we obtain a set of equations for $r_1$, $r_2$, $r_3$:

$$d_1^2 = r_2^2 a_2^2 - 2 r_1 r_2 a_1 a_2 + r_1^2 a_1^2 + r_2^2 b_2^2 -$$
$$2 r_1 r_2 b_1 b_2 + r_1^2 b_1^2 + r_2^2 c_2^2 - 2 r_1 r_2 c_1 c_2 + r_1^2 c_1^2$$

$$d_1^2 = r_2^2 (a_2^2 + b_2^2 + c_2^2) - r_1 r_2 2(a_1 a_2 + b_1 b_2 + c_1 c_2) + r_1^2 (a_1^2 + b_1^2 + c_1^2)$$

and accordingly for $d_2$, $d_3$. This can be reduced by substitution of $$h_1 = (a_1^2 + b_1^2 + c_1^2)/d_1^2,$$

$$i_1 = -2(a_1 a_2 + b_1 b_2 + c_1 c_2)/d_1^2 \text{ and}$$

$$j_1 = (a_2^2 + b_2^2 + c_2^2)/d_1^2 \quad (3)$$

and similarly for $h_2$, $h_3$, $i_2$, $i_3$, $j_2$, $j_3$ to $$h_1 r_1^2 + i_1 r_1 r_2 + j_1 r_2^2 - 1 = 0$$

$$h_2 r_2^2 + i_2 r_2 r_3 + j_2 r_3^2 - 1 = 0$$

$$h_3 r_3^2 + i_3 r_3 r_1 + j_3 r_1^2 - 1 = 0 \quad (4)$$

The equation system (4) of three equations having three unknowns $r_1$, $r_2$, $r_3$ can be solved numerically, and thus the locations of the object points $P_i$ are determined in the camera coordinate system of the camera 16. These are then transformed to the locations of the object points $P_i$ in the display coordinate system, based on the known position and alignment of the camera 16 with respect to the display device 12.

The viewing point P has a known virtual position relative to the object points $P_i$, which depends on and corresponds to the known real position of the camera 16 relative to the visual indicators 44. Thus, the virtual viewing position P may be determined with high accuracy based on the positions of the visual indicators 44 in the camera image.

The determined viewing point P of the camera 16 is then used for providing and displaying on the display a test pattern comprising image information for the corresponding viewing position P in front of the display device 12. That is, image information is provided and displayed in the stereoscopic manner as if the system parameters of the display system were already calibrated. For example, the virtual viewing position P of the camera 16 is identified with the viewing position 28 for a left eye of a viewer. Different image information is provided for the viewing positions 28 or P and 32 (S14). The image information for the viewing point 32 is, for example, not observed by the camera 16 in a calibrated state of the system.

For example, image information for the first viewing position 28 corresponding to an observer's left eye at camera position P may be a uniformly illuminated area of uniform color, e.g. a white rectangular area filling the complete display area (and, thus, producing white visual indicators 44). For example, the image information for the second viewing position 32 corresponding to an observer's right eye that should not be observed by the camera 16 may contrast to the first image information. For example, the second image information may comprise a dark shape 46 on a white background, as schematically shown in FIG. 4. The display segments 36, 38 are determined based on the viewing positions 28, 32, i.e. based on the virtual camera position P, and based on current values of the system parameters. For example, at the beginning of the calibration process, standard parameter values or values known from a previous calibration may be set as the software parameters. The different image information for the different viewing position is then displayed in the respective display segments 36, 38 (S16).

It should be noticed here that the steps of generating image information containing visual indicators 44 for the detecting of the camera position and generating the test pattern of image information for adjusting a system parameter as described herein may be combined by generating a test pattern that can be used for both purposes.

The parameter that is currently calibrated is set to a starting value. The camera image of the camera 16 is captured (S18). The camera image is evaluated (S20), and it is determined whether the camera image contains the undistorted image content supplied by the display segments 36 for the viewing position 28 or if the camera image is distorted by content supplied by adjacent segments. The parameter is varied, i.e. increased and/or decreased (S22), and a new calibration cycle is performed, until minimum and maximum parameter values corresponding to an undistorted image or a minimally distorted image are determined. An optimum parameter value is calculated. For example, the parameter value is adjusted to the mean value of minimum and maximum parameter value for undistorted or minimally distorted picture content. Thus, calibrating the currently calibrated parameter is finished. Depending on the calibration state (i.e. to what extent parameters that are to be calibrated deviate from their optimum value), minimum and maximum parameter values might be equal and/or an undistorted image might not be achievable. In this case it is still possible to determine an optimum parameter value yielding an image that contains minimal content from adjacent segments.

During each cycle the calibration method is repeated from the step of detecting the viewing position P of the camera 16 (S12). Therefore, in case the position of the calibration mirror 40 or its orientation has changed, the changed position and/or orientation is taken into account for providing and displaying image information in the next steps. Thus, the method is not dependent on strictly maintaining a fixed position of the calibration mirror 40.

In case the calibration of the currently calibrated parameter is finished, it is determined whether the calibration of the system is finished (S24), as well. In case the calibration is not yet finished, a new parameter to be calibrated is determined: the method is repeated beginning with step S10, and the new current parameter to be calibrated is adjusted.

Dedicated calibration image information may be used for the calibration of the different parameters, as the skilled person will understand. In general, the test pattern used for calibrating a specific parameter is chosen such that a deviation of that parameter from its calibrated value will show in the image as observed by the camera 16 at its viewing position. The actually used images are not part of the invention and are therefore not further described herein.

The process of optimizing parameter values may be repeated several times, e.g. until no more improvements of image quality are observed.

As described above, the method for calibrating the autostereoscopic display system comprises a feedback loop, in that after adjusting a system parameter based on a camera image, image information is provided and displayed based on the adjusted system parameter, and a new camera image is taken.

The camera 16 has two functions: First, the camera 16 provides a camera image for detecting the viewing position P of the camera by observing a virtual image of the image information displayed on the display device 12 including the visual indicators 44. Second, the camera 16 provides the camera image of a test pattern that is evaluated for calibrating a system parameter of the system.

For example, the computer system 10 comprises an evaluation unit 48 (FIG. 1) for evaluating the camera image and, depending on the evaluation, adjusting at least one parameter of the autostereoscopic display system. The evaluation unit 48 is e.g. a software unit and has access to the image of the camera 16. A control unit 50 (FIG. 1), e.g. a software unit of the computer system 10, is adapted to perform the steps S10 to S24 of the calibration method described above and controlling the evaluation unit 48.

Figure 7:
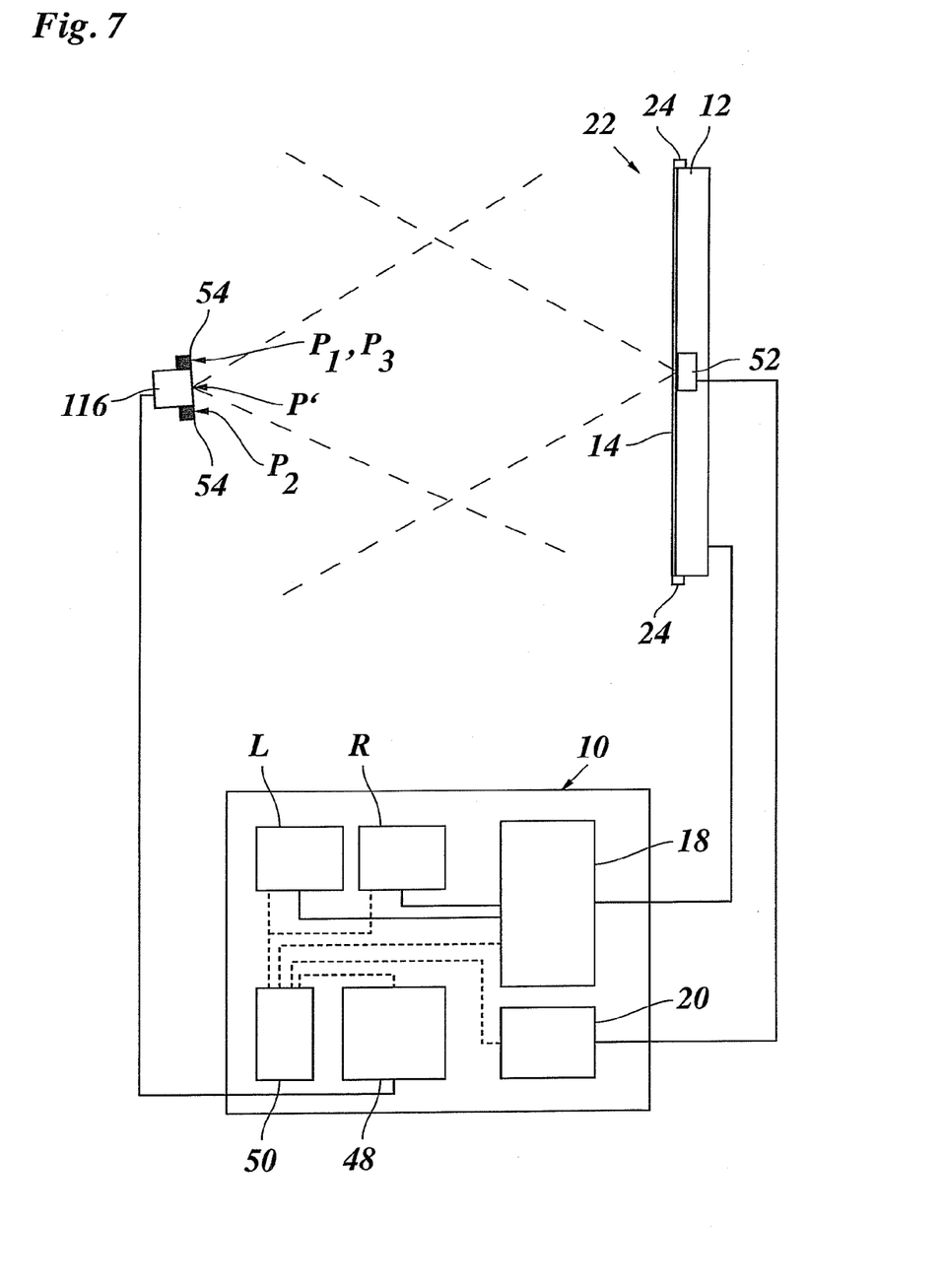
FIG. 7 is a diagram of a further arrangement for calibrating an autostereoscopic display system.

FIG. 7 illustrates a further arrangement for calibrating an autostereoscopic display system. The system and the arrangement are similar to the one described above, and same reference signs denote the same features. The arrangement comprises a first camera 116 arranged for observing image information that is displayed on the auto stereoscopic display 22, and a second camera 52 for detecting the viewing position of the first camera 116. In particular, the second camera 52 is arranged for detecting visual indicators 54 that have known spatial positions relative to the first camera 116. For example, the visual indicators 54 are attached to the first camera 116 and form calibration marks. Whereas the first camera 116 is positioned in front of the display facing the display, the second camera 52 is e.g. mounted on the display device 12 in a known relative position and orientation with respect to the display device 12. The cameras 52, 116 are connected to the computer system 10. The first camera 116 is e.g. connected via an USB interface.

The system of FIG. 7 differs from the system of FIG. 1 to FIG. 6 in that no calibration mirror 40 is required in the calibration arrangement, and in that two cameras 52 and 116 are used. For example, the first camera 116 may be held by a user in front of the display device 12. Similar to the arrangement of FIG. 4, a display area may show the camera image of the camera 116, in order to help the user aiming the camera at the display 22. In this example, a similar method of calibrating the system is performed as the one illustrated in FIG. 5, wherein differences are explained below.

The second camera 52 provides a camera image that shows the first camera 116 and the visual indicators 54, and the real positions of the visual indicators 54 with respect to a camera coordinate system of the camera 52 are determined, similar to determining the position of the object points $P_1$, $P_2$, $P_3$ with respect to the camera coordinate system of the camera 16 according to FIG. 6. Based on the known relative positions of the visual indicators 54 or calibration marks with respect to the first camera 116, the position of the camera 116 and, thus, the viewing position P' of the camera 116 is calculated (S12). For example, the viewing position P' is identified with the viewing position 28, similar as described above. Then, a test pattern comprising image information for the viewing positions 28, 32 is provided and is displayed on the display, based on the current values of the system parameters of the autostereoscopic display system (S14, S16).

An image of the first camera 116 is captured (S18) and evaluated (S20). The method continues as described above.

Thus, in this example, the visual indicators 54 or calibration marks are detected by the second camera 52 that is mounted in a known position and orientation relative to the display device 12. The viewing position of the first camera 116, which is arranged for observing image information that is displayed on the autostereoscopic display 22, is detected based on a camera image of the second camera 52, however.

Figure 8:
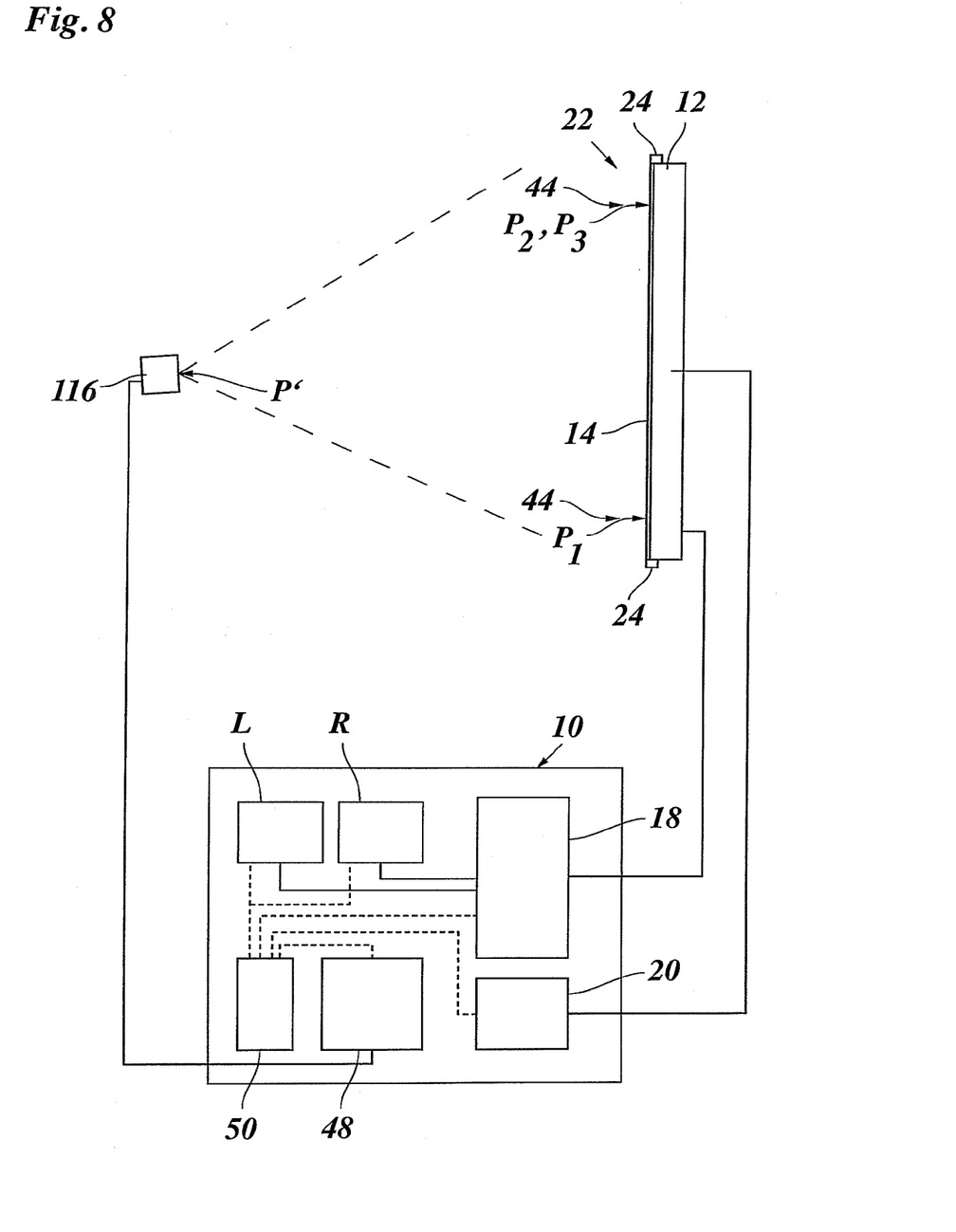
FIG. 8 is a diagram of a further arrangement for calibrating an autostereoscopic display system.

The method for calibrating an autostereoscopic display system may be used with other calibration arrangements, as well. For example, the arrangement of FIG. 7 could be modified in that only the first camera 116 is used for providing a camera image, based on which the system parameters are adjusted, and for detecting its own viewing position P' with respect to the display. Such an arrangement is depicted in FIG. 8. In this case, for example, the step of detecting the viewing position of the camera 116, which is arranged for observing image information that is displayed on the display, comprises detecting visual indicators which have known spatial positions relative to the display device 12. For example, visual indicators 44 as shown in FIG. 4 and FIG. 8 may be displayed on the display device 12, and the position and relative orientation of the camera 116 relative to the display device 12 may be determined based on the known size and arrangement of the visual indicators 44 and the camera image of the visual indicators 44. This involves the steps of determining the real positions of the object points $P_i$ representing the visual indicators 44 in the camera coordinate system of the camera 116 similar as described above, and a final coordinate transformation from the camera coordinate system of the camera 116 to the display coordinate system of the display 12. The arrangement of FIG. 8 is particularly useful for calibration during manufacturing of the autostereoscopic display system.

A software product for calibrating an autostereoscopic display system according to the above, includes program code that is stored on a non-transitory computer-readable medium and, when run on a computer system connected to a display of the autostereoscopic display system and adapted to receive camera images from a camera that is arranged to be able to observe the display, causes the computer system to perform the method described above.

What is claimed is:

1. A method for calibrating an autostereoscopic display system, comprising the steps of:
   detecting a camera viewing position of a camera arranged to be able to observe a display of the autostereoscopic display system,
   providing and displaying on the display in an autostereoscopic display mode of the display a test pattern comprising different image information for at least two laterally displaced respective viewing positions in front of the display, of which viewing positions for the test pattern at least one is based on the detected camera viewing position,
   evaluating a camera image of the test pattern as observed by the camera, and
   adjusting the autostereoscopic display system, based on the evaluations of the camera image.

2. The method of claim 1, wherein the camera viewing position is one of:
   a real viewing position and
   a virtual viewing position in front of the display.

3. The method of claim 1, wherein the step of detecting the camera viewing position of the camera comprises the step of detecting visual indicators, which have known spatial positions relative to the camera.

4. The method of claim 3, wherein the step of detecting the visual indicators includes the step of detecting the visual indicators using a camera that is mounted in a known position and orientation relative to a display device of the display.

5. The method of claim 4, wherein the step of detecting the camera viewing position comprises the step of determining the camera viewing position based on the positions of the visual indicators in a camera image of said camera that is mounted in a known position and orientation relative to the display device.

6. The method of claim 1, further comprising the step of arranging said camera, which is arranged to be able to observe the display of the autostereoscopic display system, to be able to observe said display reflected by a mirror.

7. The method of claim 1, further comprising the step of detecting said camera viewing position of the camera arranged to be able to observe a display of the autostereoscopic display system, based on a camera image of said camera.

8. The method of claim 1, wherein the step of detecting the camera viewing position of said camera comprises the step of detecting visual indicators, which have known spatial positions relative to a display device of the display.

9. The method of claim 8, wherein the step of detecting the visual indicators comprises the step of determining one of real and virtual positions of the visual indicators based on the positions of the visual indicators in a camera image of said camera and based on known relative positions of the visual indicators.

10. The method of claim 8, wherein the step of detecting the camera viewing position comprises the step of determining the camera viewing position based on the positions of the visual indicators in a camera image of said camera.

11. The method of claim 1, wherein the step of adjusting the autostereoscopic display system comprises adjusting at least one of system parameters of the autostereoscopic display system that characterises a relative spatial arrangement of a display device and an imaging array of the display, the imaging array being adapted for directing different images to different viewing positions.

12. The method of claim 1, wherein the step of adjusting the autostereoscopic display system comprises the step of adjusting at least one software parameter of the autostereoscopic display system.

13. The method of claim 1, wherein the step of adjusting the autostereoscopic display system comprises the step of adjusting at least one software parameter of the the autostereoscopic display system, which at least one software parameter characterises at least one of the following:
- a relative displacement of a display device and an imaging array of the autostereoscopic display system in a direction parallel to the plane of the display device,
- a relative rotation about a direction normal to the plane of the display device,
- a relative displacement of the display device and the imaging array in a direction normal to the plane of display device,
- said camera viewing position of the camera with respect to the display device,
- a viewing distance of the camera with respect to the display device,
- at least one of a horizontal and vertical displacement of the camera viewing position from the center of the display device,
- at least one of an optical and geometrical parameter of at least one of:
  - an imaging array of the autostereoscopic display system and
  - lenses of the imaging array, and
- a combination of two or more of these.

14. A system for the autostereoscopic representation of images, the system comprising a display adapted for displaying different images for at least two laterally displaced viewing positions in front of the display in an autostereoscopic display mode of the display, a camera, and a computer system adapted to carry out the method according to claim 1.

15. A software product for calibrating an autostereoscopic display system, comprising program code that is stored on a non-transitory computer-readable medium and, when run on a computer system connected to a display of the autostereoscopic display system and adapted to receive camera images from a camera that is arranged to be able to observe the display, causes the computer system to perform the method according to claim 1.

16. The method of claim 1, further comprising repeating the steps of:
- detecting a camera viewing position of the camera arranged to be able to observe the display of the autostereoscopic display system,
- providing and displaying on the display in an autostereoscopic display mode of the display a test pattern comprising different image information for at least two laterally displaced respective viewing positions in front of the display, of which viewing positions at least one is based on the newly detected camera viewing position,
- evaluating a new camera image of the test pattern as observed by the camera, and
- adjusting the autostereoscopic display system, based on the evaluation of the new camera image.

17. The method of claim 16, comprising iteratively adjusting at least one system parameter of the autostereoscopic display system by said repeating of the said steps,
wherein said at least one system parameter comprises at least one of:
- a physical parameter, and
- a software parameter.

* * * * *